United States Patent
Llach et al.

(10) Patent No.: US 9,164,966 B1
(45) Date of Patent: Oct. 20, 2015

(54) DETERMINING SIZES OF CONTENT ITEMS

(71) Applicants: Omer Gimenez Llach, San Francisco, CA (US); Brandon Murdock Pearcy, San Francisco, CA (US); Nathan Peter Lucash, San Francisco, CA (US)

(72) Inventors: Omer Gimenez Llach, San Francisco, CA (US); Brandon Murdock Pearcy, San Francisco, CA (US); Nathan Peter Lucash, San Francisco, CA (US)

(73) Assignee: Google Inc., Mountain View, CA (US)

( * ) Notice: Subject to any disclaimer, the term of this patent is extended or adjusted under 35 U.S.C. 154(b) by 355 days.

(21) Appl. No.: 13/659,520

(22) Filed: Oct. 24, 2012

(51) Int. Cl.
*G06F 17/00* (2006.01)
*G06F 17/21* (2006.01)
*G06F 17/24* (2006.01)

(52) U.S. Cl.
CPC .............. *G06F 17/211* (2013.01); *G06F 17/24* (2013.01)

(58) Field of Classification Search
CPC . G05F 17/24; G05F 17/30017; G05F 17/211; G05F 17/2294; G05F 17/25; G06T 11/60
USPC .......................................................... 715/246
See application file for complete search history.

(56) References Cited

U.S. PATENT DOCUMENTS

| | | | |
|---|---|---|---|
| 5,379,229 A | 1/1995 | Parsons et al. | |
| 6,820,277 B1 | 11/2004 | Eldering et al. | |
| 7,263,668 B1 | 8/2007 | Lentz | |
| 7,594,189 B1 * | 9/2009 | Walker et al. | 715/811 |
| 7,694,221 B2 | 4/2010 | Fortes | |
| 7,904,799 B1 | 3/2011 | Underwood et al. | |
| 7,983,959 B2 | 7/2011 | Chickering et al. | |
| 8,001,105 B2 | 8/2011 | Bolivar et al. | |
| 8,086,957 B2 | 12/2011 | Bauchot et al. | |
| 8,090,706 B2 | 1/2012 | Bharat | |
| 8,112,454 B2 * | 2/2012 | Aravamudan et al. | 707/803 |
| 8,196,162 B2 | 6/2012 | Van De Klashorst | |
| 8,214,454 B1 | 7/2012 | Barnes et al. | |
| 8,335,712 B1 | 12/2012 | Crucian et al. | |
| 8,577,181 B1 | 11/2013 | Badros et al. | |
| 8,738,448 B2 | 5/2014 | Zhang | |
| 2004/0267965 A1 | 12/2004 | Vasudevan et al. | |
| 2005/0021403 A1 | 1/2005 | Ozer et al. | |

(Continued)

FOREIGN PATENT DOCUMENTS

| | | |
|---|---|---|
| EP | 2 068 251 A2 | 10/1995 |
| JP | 2012-073863 A | 4/2012 |

(Continued)

OTHER PUBLICATIONS

International Search Report and Written Opinion mailed Mar. 27, 2014 in PCT Application No. PCT/US2013/074279 (11 pages).

(Continued)

*Primary Examiner* — Scott Baderman
*Assistant Examiner* — Jason Edwards
(74) *Attorney, Agent, or Firm* — Foley and Lardner LLP; John D. Lanza

(57) ABSTRACT

Systems and methods of distributing content items to a resource via a computer network are described. A statistical distribution representing display sizes of content items with respect to a slot having a plurality of parameters may be generated. A request to provide a content item for display in a slot of the resource may be received. Content items for display in the slot of the resource may be selected based on the statistical distribution. Selecting content items for display in the slot may include optimizing an appearance of a content item in the slot or maximizing a number of a plurality of content items in the slot.

15 Claims, 9 Drawing Sheets

(56) References Cited

U.S. PATENT DOCUMENTS

| | | |
|---|---|---|
| 2005/0041647 A1 | 2/2005 | Stinnie |
| 2007/0162844 A1 | 7/2007 | Woodall et al. |
| 2007/0174291 A1 | 7/2007 | Cooper et al. |
| 2008/0262913 A1 | 10/2008 | Reitz et al. |
| 2008/0270890 A1 | 10/2008 | Stern |
| 2009/0012863 A1 | 1/2009 | Saephan |
| 2009/0012905 A1 | 1/2009 | Mawani et al. |
| 2009/0085921 A1* | 4/2009 | Do et al. ................ 345/543 |
| 2009/0089668 A1* | 4/2009 | Magnani et al. ............ 715/273 |
| 2009/0150253 A1 | 6/2009 | Williams et al. |
| 2009/0172730 A1 | 7/2009 | Schiff et al. |
| 2009/0216364 A1 | 8/2009 | Grissom |
| 2009/0307188 A1 | 12/2009 | Oldham et al. |
| 2010/0042749 A1 | 2/2010 | Barton |
| 2010/0057569 A1 | 3/2010 | Cantelmo et al. |
| 2010/0114696 A1 | 5/2010 | Yang |
| 2010/0115064 A1 | 5/2010 | Tsun et al. |
| 2010/0198694 A1 | 8/2010 | Muthukrishnan |
| 2011/0007096 A1 | 1/2011 | Miyano |
| 2011/0035345 A1 | 2/2011 | Duan et al. |
| 2011/0119124 A1 | 5/2011 | Pradeep et al. |
| 2011/0145730 A1 | 6/2011 | Zhou |
| 2011/0153421 A1 | 6/2011 | Novikov et al. |
| 2012/0310735 A1 | 12/2012 | Kniaz et al. |
| 2013/0014008 A1* | 1/2013 | Damera-Venkata ......... 715/252 |
| 2013/0024757 A1 | 1/2013 | Doll et al. |
| 2013/0305144 A1* | 11/2013 | Jackson et al. ............ 715/246 |
| 2014/0095514 A1 | 4/2014 | Filev et al. |

FOREIGN PATENT DOCUMENTS

| | | |
|---|---|---|
| WO | WO-02/27574 A1 | 4/2002 |
| WO | WO-2006/055751 A2 | 5/2006 |
| WO | WO-2009/111123 A1 | 9/2009 |
| WO | WO-2010/088479 A2 | 8/2010 |

OTHER PUBLICATIONS

US Office Action in U.S. Appl. No. 13/725,302, dated Jun. 4, 2014, 21 pages.
US Office Action on U.S. Appl. No. 13/725,302 mailed Oct. 28, 2014, 24 pages.
Office Action on U.S. Appl. No. 13/724,391 dated Jan. 13, 2015.
Office Action on U.S. Appl. No. 13/724,391 dated Aug. 13, 2014.
PCT International Search Report/Written Opinion for PCT/US2013/074276, Dated Mar. 28, 2014, 9 pages.
US Advisory Action on U.S. Appl. No. 13/725,302, dated May 26, 2015, 3 pgs.
US Office Action on U.S. Appl. No. 13/627,334 Dated May 18, 2015.
US Office Action on U.S. Appl. No. 13/627,334, dated Nov. 18, 2014, 19 pages.
US Office Action on U.S. Appl. No. 13/725,302 Dated Mar. 20, 2015, 27 pgs.

* cited by examiner

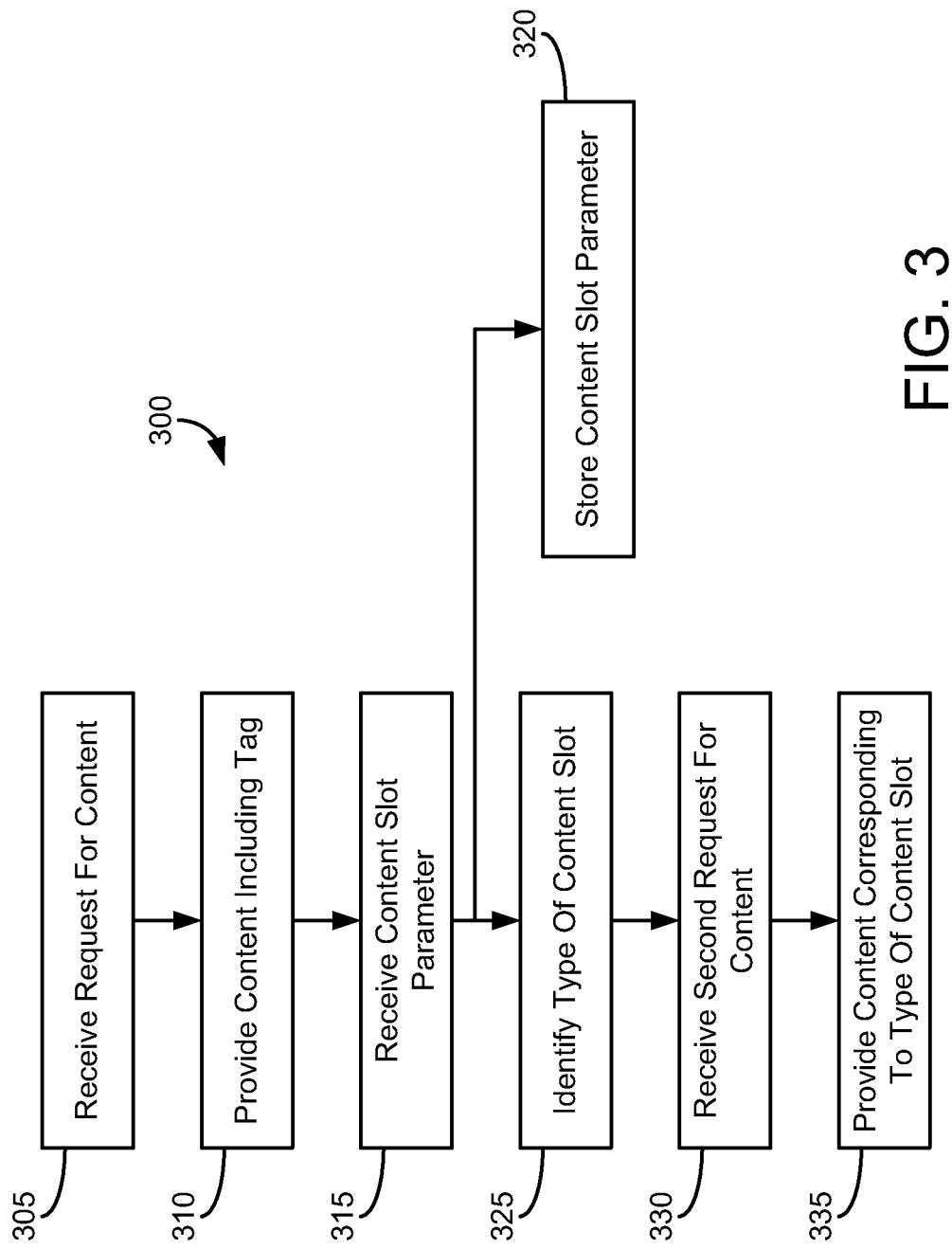

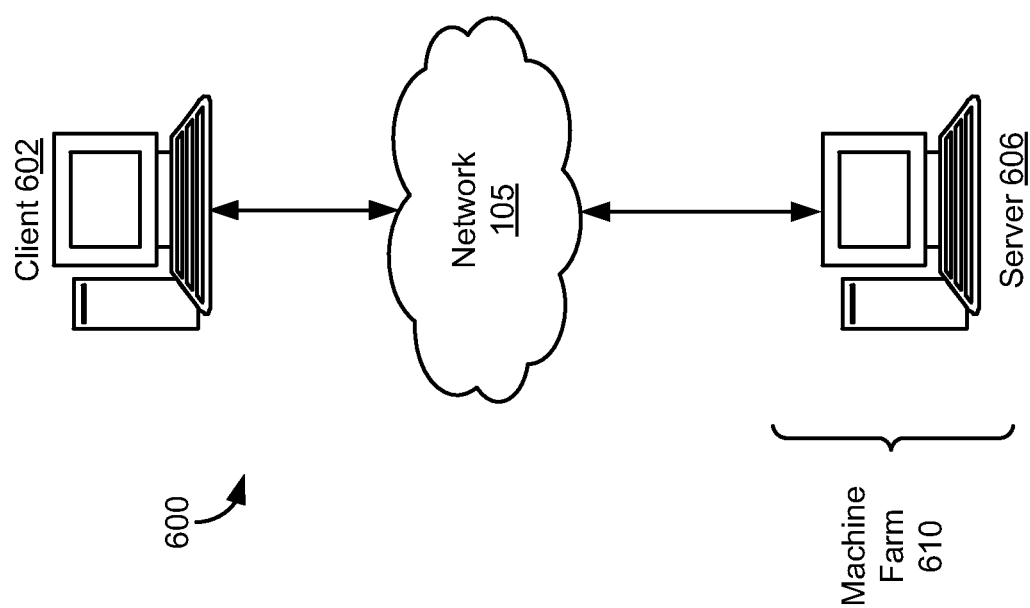

DETERMINING SIZES OF CONTENT ITEMS

BACKGROUND

In a networked environment such as the Internet, entities such as content providers may provide information for display on a resource (e.g., a web page). The resources may include text, video, graphics, or audio information provided by the entities via a server. Additional or alternative content items may also be provided by third parties for concurrent display with the main content. Thus, a user device accessing a resource may be provided with the main content of the resource, as well as third party content items. A content distribution system may be used to determine which third party content to provide for concurrent display.

SUMMARY

One implementation of the present disclosure relates to a method of distributing content items to a resource via a computer network. The method includes generating a statistical distribution representing sizes of content items with respect to a slot having a plurality of parameters. Generating the statistical distribution includes receiving a sample set of content items and rendering each of the sample set of content items in an experiment slot at an experiment device by varying a plurality of parameters of the experiment slot. The method further includes receiving, at a data processing system via the computer network, a request to provide a content item for display in a slot of the resource. The method further includes selecting content items for display in the slot based on the statistical distribution. Selecting content items may include optimizing an appearance of the content item in the slot based on the statistical distribution or maximizing a number of a plurality of content items in the slot based on the statistical distribution.

Another implementation of the present disclosure relates to a system for distributing content items to a resource via a computer network. The system includes a data processing system having at least one of a content slot identification module and a content slot measurement module. Generating the statistical distribution includes receiving a sample set of content items and rendering each of the sample set of content items in an experiment slot at an experiment device by varying a plurality of parameters of the experiment slot. The data processing system may further be configured to receive a request to provide a content item for display in a slot of the resource. The data processing system may further be configured to select content items for display in the slot based on the statistical distribution. Selecting content item renderings may include optimizing an appearance of the content item in the slot based on the statistical distribution or maximizing a number of a plurality of content items in the slot based on the statistical distribution.

Another implementation of the present disclosure relates to a computer readable storage medium having instructions to distribute content items to a resource via a computer network. The instructions include generating a statistical distribution representing sizes of content items with respect to a slot having a plurality of parameters Generating the statistical distribution includes receiving a sample set of content items and rendering each of the sample set of content items in an experiment slot at an experiment device by varying a plurality of parameters of the experiment slot. The instructions further include receiving, at a data processing system via the computer network, a request to provide a content item for display in a slot of the resource. The instructions further include selecting content items for display in the slot based on the statistical distribution. Selecting content items may include optimizing an appearance of the content item in the slot based on the statistical distribution or maximizing a number of a plurality of content items in the slot based on the statistical distribution.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 3 is a flow chart illustrating an example method of distributing content to a resource via a computer network in accordance with a described implementation.

FIG. 6 illustrates an example network environment comprising client machines in communication with remote machines in accordance with a described implementation.

DETAILED DESCRIPTION

Figure 1:
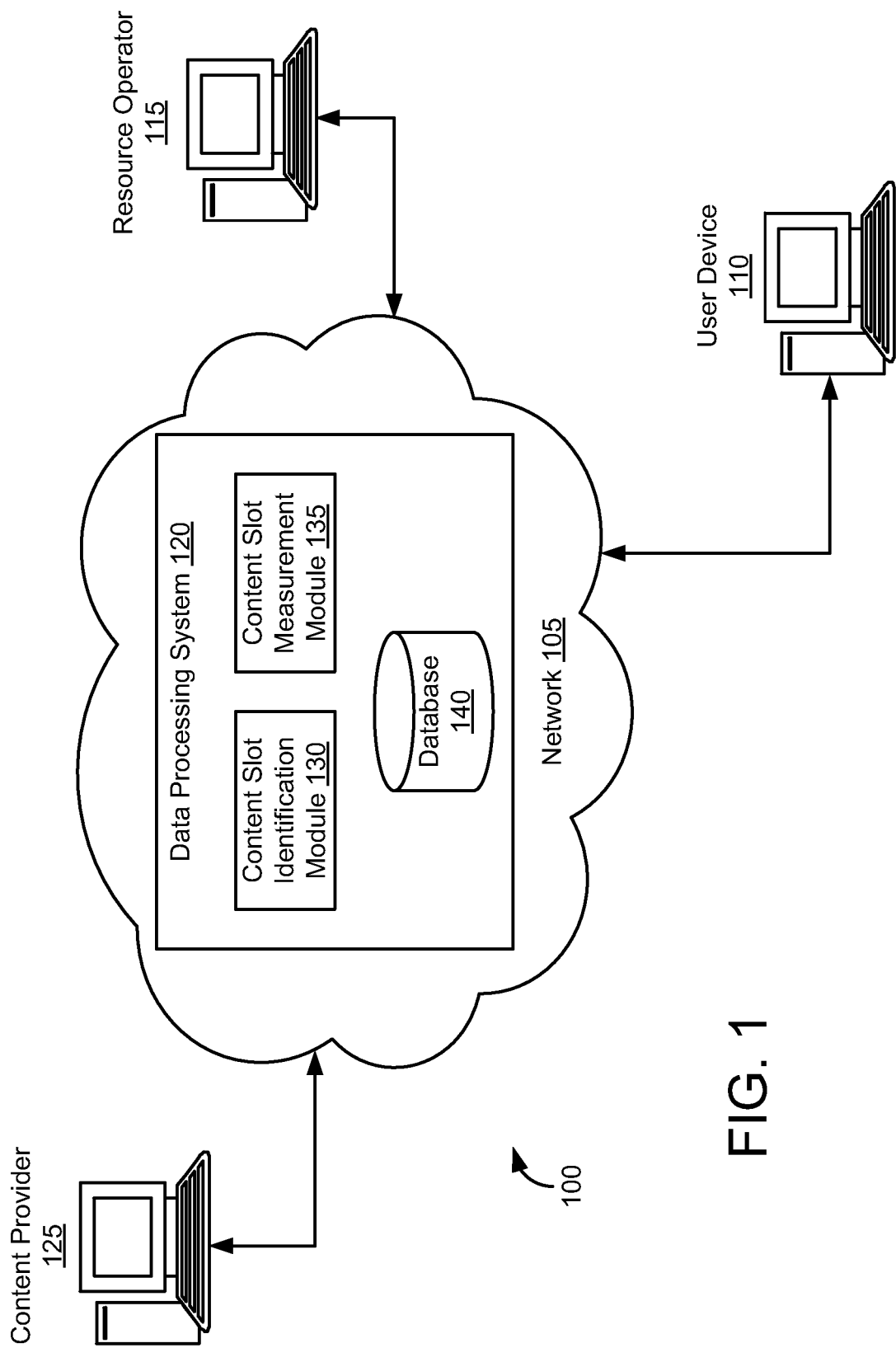
FIG. 1 is an illustration of an example system for distributing content to a resource via a computer network in accordance with a described implementation.

Referring generally to the figures, the systems and methods described herein are directed to distributing content items to network resources, such as web pages, via a computer network. In a content distribution system, the size of a content item may need to be known, so that it may be determined how many content items may be requested to fill a given area of space. The exact space requirement may depend on the textual content in a given content item, the platform on which the content item is being displayed, the fonts being used in the content item, the layout of the various components of the content item, and other content item properties.

In an implementation of the present disclosure, a probabilistic approach may be implemented to measure sizes of textual content items. For example, a set of textual content items may be sampled, and weighted by the number of times the content items are shown. The content items may be categorized. The content items may be categorized based on information available prior to selection of the content item. This information may relate to any information that can affect the display size of the content item. As one example, the content items may be categorized by language (e.g., some languages may have a higher propensity to feature longer words than other languages, which affects the size of the textual content item). As another example, geographic location information (e.g., country) may be used to categorize the language, provided that a user has given permission to share such information. As yet another example, other information pertaining to a user device or device identifier may be used, provided that a user has given permission to share such information.

The sampled content items may then be rendered on a platform and displayed inside a browser. The content items can be measured using JAVASCRIPT on the browser. In an example, for each sample content item, the width available for rendering can be constrained, and the height needed can be measured. A modified binary-search algorithm may be employed to find the width where there would be an inflection in the height needed to render the content item, as the content item may flow to one fewer or one more line.

The process can be repeated to find truncations points for a given content item. A step-curve can be obtained showing the relationship between the width and height needed to display the content item. Given a large number of sample content items, it can be probabilistically determined the number of content items that might truncate if rendered into a fixed content slot (e.g., a fixed rectangle of known size) with given fixed input variables such as a font-face or font size of the text of the content item, the platform on which the content item is to be displayed, etc. Given such information, a distribution may be derived, in the form of a curve, for a given acceptable percentage of truncated content items (such a distribution is shown in greater detail in FIG. 4E).

In a content slot where more than one content item may be shown, some of the content items may need less space than typical and some content items may need more space than typical. Combinatorially selecting sizes based on the measured distributions allows a content server to more efficiently use the fixed space in the content slot (e.g., by selecting more than one content item of different sizes such that all selected content items fit in the content slot). For example, it may be 95% likely that one content item will be shorter than 100 pixels (px) of height, and it may be much less likely that two content items will need more than 200 px of height.

As one implementation of the present disclosure, instead of using the systems and methods described herein to select multiple content items, the systems and methods may be used for individual components of a single content item. A content item may be broken into its constituent portions (e.g., title, main text, visible URL link, etc.), and the space needed for each portion may be combined to determine the space needed by the whole content item.

Referring now to FIG. 1, and in brief overview, a system 100 for serving parameter-dependent content to a resource may include a computer network 105 having at least one data processing system 120. Data processing system 120 may include at least one processor or logic device to communicate via network 105 with at least one content provider 125 and at least one resource operator 115. Data processing system 120 may also include at least one content slot identification module 130, at least one content slot measurement module 135, and at least one database 140. A user device 110 may access resources provided by resource operator 115 via network 105. For example, a web browser of user device 110 may access a server provided by resource operator 115 to retrieve a web page for display at user device 110.

Still referring to FIG. 1, and in greater detail, user device 110 may include one or more user interface devices (e.g., a laptop, desktop, tablet, personal digital assistants, smart phones, portable computer, etc.). A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of user device 110 (e.g., a built-in display, microphone, etc.) or external to the housing of user device (e.g., a monitor or speaker connected to user device 110, etc.), according to various implementations. For example, user device 110 may include an electronic display capable of displaying web pages or other resource or content data received from resource operator 115, content provider 125, or network 105.

Still referring to FIG. 1, resource operator 115 may be an entity operating or providing a resource as well as the resource server that communicates with network 105 to make the resource available to user device 110. In one implementation, resource operator 115 may request content from data processing system 120. Data processing system 120 may then request content from content provider 125 in response to the request from resource operator 115. In some implementations, data processing system 120 may retrieve one or more content items and store the content in database 140. Data processing system 120 may retrieve content from content provider 125 and select the content to provide to resource operator 115 based on a plurality of factors. In another implementation, data processing system 120 may instruct content provider 125 to provide content directly to resource operator 115.

Still referring to FIG. 1, content provider 125 may be one or more electronic devices connected to network 105 that provide content to one or more user devices 110 via the network 105. The content and content items may be any type of information for display on a network resource. The content items may be images, flash animations, video or graphical displays, text-based content, or any combination thereof. In one embodiment, the content distribution system may be an advertising system and the content items may be advertisements. However, the systems and methods of the present disclosure may also be applied to any other type of content distribution system or content item.

Still referring to FIG. 1, network 105 may be a network such as the Internet, local, metro, or wide area networks (WAN), intranets, cellular networks, satellite networks, or other communication networks such as mobile telephone networks. Network 105 may also include any number of computing devices (e.g., computers, servers, routers, network switches, etc.) and may further include any number of hardwired and/or wireless connections. For example, network 105 may communicate wirelessly (e.g., via WiFi, cellular, radio, etc.) with a transceiver hardwired (e.g., via a fiber optic cable, a CAT5 cable, etc.) to other devices in network 105 and system 100. Network 105 may be used to access resources capable of display on at least one user device 110.

Still referring to FIG. 1, network 105 may include a data processing system 120. In one implementation, data processing system 120 may obtain content slot information via computer network 105. The content slot may be on the resource being viewed by user device 110. The resource may further be associated with resource operator 115. For example, data processing system 120 can obtain content slot information such as at least one content slot parameter (e.g., a unique content slot ID, content slot position, browser document size, or content slot dimensions). In one implementation, content slot information may be used to determine if one or more content items may fit in the content slot, as described with reference to method 200 below.

In one implementation, data processing system 120 or another content placement server may use a content slot code. A content slot code may be an identifier and may be tied to various web operator and/or publisher settings. The unique content slot ID, on the other hand, is an ID that is correlated with a certain content slot on a resource. This unique content slot ID represents the content slot for which data processing system 120 may attempt to gather data. For example, the same content slot code may be associated with content slots that appear on multiple resources. In one resource, the content slot code may be associated with a content slot on the left side of the resource, whereas on another resource, the content slot code may be associated with a content slot on the right side of the resource. In these cases, data processing system 120 may attempt to determine a unique content slot ID for each of the two content slots with the same content slot code. In one implementation, data processing system 120 may determine a unique content slot ID by combining the content slot with the URL associated with the content slot. In another implementation, data processing system 120 may use various other parameters to generate a unique content slot ID, including, for example, the content slot's location in the resource's DOM tree.

In one implementation, data processing system 120 may include an interface configured to receive a request via network 105 to provide content for display in a content slot of a resource. Data processing system 120 may receive the request in real-time (e.g., between the time that user device 110 requests access to a resource of resource operator 115 and the time that resource operator 115 displays the resource to user device 110).

Still referring to FIG. 1, data processing system 120 may include at least one content slot measurement module 135. Content slot measurement module 135 may measure or otherwise obtain at least one parameter associated with the content slot. For example, content slot measurement module 135 can inject a tag into content provided to resource operator 115 for display on the resource. Content slot measurement module 135 may append a script tag into a rich media content item (e.g., an HTML content item, expandable content item, above the fold content item, or other multimedia content item that includes one or more of text, audio still images, animation, video, or interactive content). The script tag may be a JAVASCRIPT tag. The tag may execute at the resource server to determine at least one parameter of the content slot of the web page. The parameter may include a unique content slot ID, content slot position, browser document size, or content slot length and width. In one implementation, content slot measurement module 135 may append the following example script tag to HTML code:
<script src=http://pagead2.examplesyndication.com/pagead/js/dam.js>
  </script>

In one implementation, content slot measurement module 135 may inject the script tag into all rich media content that is being provided to a user device. In another implementation, content slot measurement module 135 injects the script tag into a predetermined percentage (e.g., two percent) of rich media content provided for display on a given resource or content slot. Because the number of requests and content items served in a given time period is very large, retrieving measurements from a small percentage of requests is sufficient to obtain a statistically significant sample of measurements. In another example, adding more processing may slow the processes related to loading and interacting with the resource. For example, the script tag may be measuring all content slots continuously, including those for which data already exists, in order to detect possible changes in resources (e.g., a publisher moving a content slot from the right side of the resource to the left side of the resource). Thus, in one implementation, the scrip tag is injected as necessary to mitigate unnecessary processing of a resource. For example, the script tag may be injected five percent, ten percent, fifty percent or more of the time. In another implementation, the percentage of necessary measurements per day may vary. For example, for certain resources, the percentage may be higher due to the number of content requests during a given time period (e.g., a day, an hour, a month). In one implementation, content slot measurement module 135 can automatically determine how many measurements are necessary during a given time period to get statistically significant data and vary the number of requests accordingly.

In another implementation, content slot measurement module 135 may also receive at least one parameter of the content slot. For example, the resource server of resource operator 115 may execute the JAVASCRIPT tag to determine one or more parameter of the content slot. The JAVASCRIPT tag may combine the determined parameter with other available data and report it to content slot measurement module 135 via network 105. For example, content slot measurement module 135 may receive the unique content slot ID of the content slot and position data.

Still referring to FIG. 1, data processing system 120 may include a content slot identification module 130. Content slot identification module 130 may identify the type of content slot that is requesting content based on one or more parameters. For example, content slot identification module 130 may identify whether the content slot is a legacy content slot not capable of running JAVASCRIPT at the time of content request, an expandable content slot, or an above the fold content slot.

In one implementation, content slot identification module 130 may identify the content slot as being a legacy content slot, including, for example, a content JAVASCRIPT backfill content slot (ADJ) or a content iframe slot (ADI). Legacy content slots do not provide the possibility to run JAVASCRIPT code at content request time. In one implementation, content slot identification module 130 may determine whether a content slot is a legacy content slot based on the special parameters that are received as part of the content request. For example, the content request from a legacy content slot may include special parameters, such as adserver_req=special_parameter. In another implementation, the content request from a legacy content slot may first communicate with a special server associated with legacy content slots, which then communicate with data processing system 120. This communication may further include additional information such as an original content URL, an adserver_req=special_parameter, or bid prices for content items.

In one implementation, content slot identification module 130 analyzes one or more parameters of the content slot to determine whether the slot is capable of displaying an expandable content item. Expandable content items includes, for example, content that expands from a display banner when a user takes an action to interact with the content, including, for example, rolling a mouse over the content to reveal a larger content space that can contain interactive content including, for example, video, coupons, data collection, gaming, and polling.

In one implementation, content slot identification module 130 may analyze the position data for the content slot received by content slot measurement module 135 to determine whether the content slot is an expandable content slot. Based on the position data for the content slot, content slot identification module 130 may determine that a content item can expand in a given direction without being clipped. For example, content slot identification module 130 may determine that the content slot is positioned on the top of the resource and further determine that the content slot can expand down without clipping the content item. In one implementation, content slot identification module 130 may authorize the content slot to expand in accordance with the determination made by content slot identification module 130.

In another implementation, content slot identification module 130 may analyze one or more of the position data, browser document size data, and content slot size data to determine whether the content slot is an "above the fold" content slot. An above the fold content slot may be a content slot capable of being viewed at the time the resource is initially displayed. For example, the content slot may be an above the fold content slot if the content slot can be viewed without scrolling the resource.

In one implementation, content slot identification module 130 may receive parameter data including a plurality of parameters corresponding to a unique content slot ID. In one implementation, data processing system 120 may analyze a plurality of parameters to verify that one or more parameters are stable. For example, parameter data associated with a content slot on a given resource may vary over multiple content requests or from one content request to another content request. Parameter data may change for a plurality of reasons. For example, resource operator 115 may alter the parameters associated with a content slot for any reason. In another example, resource operator 115 may alter the contents of the resource, which may alter one or more content slot parameters. In another example, font size or text size may be altered via a web browser, which may affect one or more content slot parameters.

In one implementation, data processing system 120 may determine whether the parameter data is stable by comparing a plurality of parameters to each other. Data processing system 120 may further compare the difference between parameters with a stability threshold.

In another implementation, data processing system 120 may perform a statistical analysis to determine a stability metric. The stability metric may be the variance of measurements of a parameter, the average difference of measurements of a parameter, or a mean, mode or any other metric that identifies the stability of measurements of a parameter. For example, the parameters may be the horizontal and vertical coordinates (X and Y coordinates) in pixels of the content slot from the top left corner of the web page. The Y coordinate may be the same from one measurement of the parameter to another, whereas the X coordinate may vary by one or more pixels from one content request to another. Thus, the stability metric for the Y coordinate may indicate that the parameter is stable, and the stability metric for the X coordinate may indicate that the parameter is unstable. The stability metric may indicate a range of variation, a likelihood that the next measurement of the parameter will fall within a certain range of coordinates, or a standard deviation.

The stability metric may indicate whether one or more parameters are stable enough to provide a certain type of content item. For example, data processing system 120 may determine that a content slot's vertical position is stable, while the content slot's horizontal position varies significantly from content request to content request. Components of data processing system 120 such as content slot identification module 130 may determine that while an expandable content item that expands in the horizontal direction may be clipped, an expandable content item that expands toward the bottom of the page may not be clipped. Thus, content slot identification module 130 may identify the content slot as having content slot parameter data that is stable enough to consistently display an expandable content item that expands toward the bottom of the resource without being clipped.

In one implementation, content slot identification module 130 may identify a content slot's parameters as being stable enough to consistently display an above the fold content item. For example, the parameters content slot identification module 130 may analyze to determine one or more stability metrics may include at least one of position, browser document size, and content slot size (e.g., width, height). If one or more stability metrics are below a stability threshold (e.g., standard deviation, variance, range, average difference), then content slot identification module 130 may determine that the content slot can consistently display an above the fold content item.

In one implementation, resource operator 115 may request content for a given content slot a plurality of times for renderings of the resource at a plurality of user devices 110. Content slot measurement module 135 may inject a tag into content a plurality of times, and receive a plurality of parameters about the content slot and store the parameters in database 140. Content slot identification module 130 may analyze the stored parameters in database 140 to make a determination about the content slot. For example, content slot identification module 130 may analyze each position data for the content slot to determine whether there is stable position data for the content slot. For example, if the content slot has requested content one-thousand times, and for all one-thousand requests, content slot measurement module 135 received the same position coordinates, content slot identification module 130 may determine that the content slot has stable position data. Thus, if the content slot has stable position data, content slot identification module 130 may select a type of content item that depends upon stable position data.

Still referring to FIG. 1, data processing system 120 may include a database 140 designed and constructed to organize, store, retrieve, or transmit a plurality of data, including data pertaining to one or more content slot. Database 140 may be configured to interact with any component of system 100 including data processing system 120, content slot identification module 130, content slot measurement module 135, content provider 125, resource operator 115, or user device 110. Database 140 may store one or more parameters of a content slot determined by content slot measurement module 135. In another implementation, database 140 may store the content provided by content provider 125. For example, database 140 may store a content item provided to resource operator 115, with or without an injected tag.

Figure 2A:
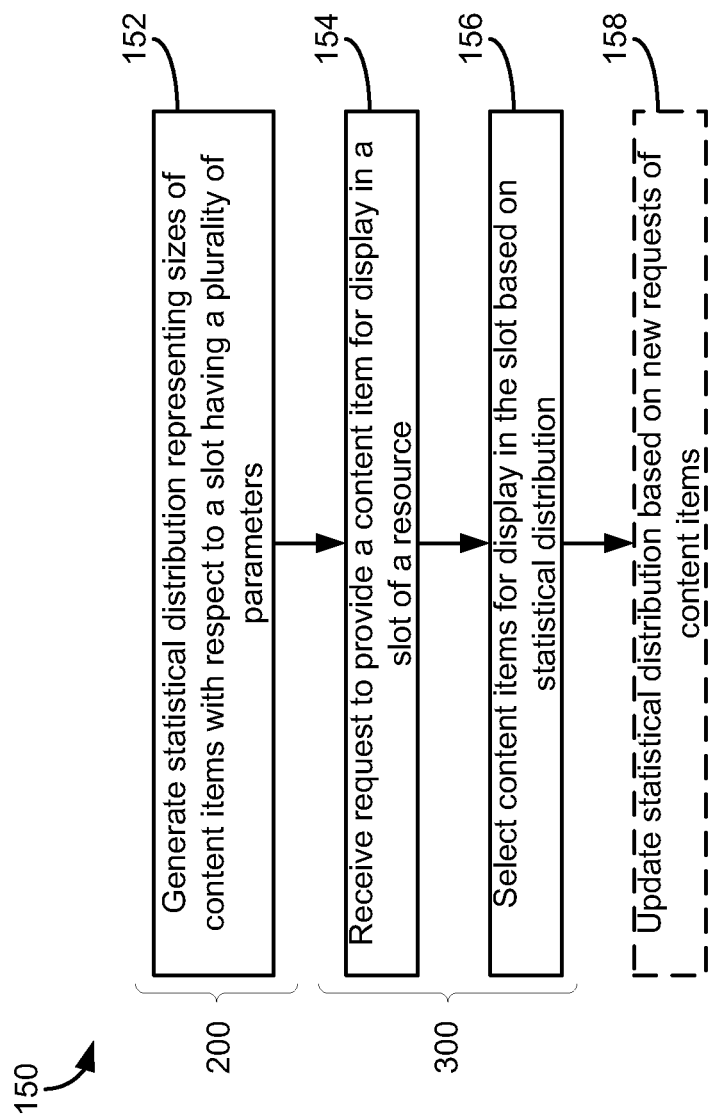
FIG. 2A is a flow chart of a process for distributing content items to a resource using a statistical distribution of the content items in accordance with a described implementation.

Referring now to FIG. 2A, a flow chart of a process 150 for distributing content items to a resource via a computer network is shown in accordance with a described implementation. In brief overview, process 150 may include generating a statistical distribution representing display sizes of content (block 152), receiving a request to provide a content item for display in a slot of a resource (block 154), selecting content items for display in a slot based on the statistical distribution (block 156), and optionally updating the statistical distribution based on new requests for content items (block 158).

Still referring to FIG. 2A, process 150 may include generating a statistical distribution representing sizes of content items with respect to a content slot having a plurality of parameters (block 152). The activities of block 152 may include receiving a sample set of content items and rendering each of the sample set of content items in an experiment slot at an experiment device by varying a plurality of parameters of the experiment slot. The plurality of parameters may include a size of the slot, a user interface parameter, a font of the resource, or a browser type. The statistical distribution may further be obtained by rendering a plurality of combinations of content items in the experiment slot at the experiment device and determining space needs of the plurality of combinations.

The statistical distribution may be a truncation curve indicative of a percentile of content items with a first dimension below the truncation curve at a corresponding second dimension. For example, also referring to FIGS. 4A-C, the statistical distribution is shown as a 95% truncation curve as described above. The activities of block 152 may generally be completed by method 200 shown in FIG. 2B to generate the truncation curves shown in FIGS. 4A-C.

Figure 2B:
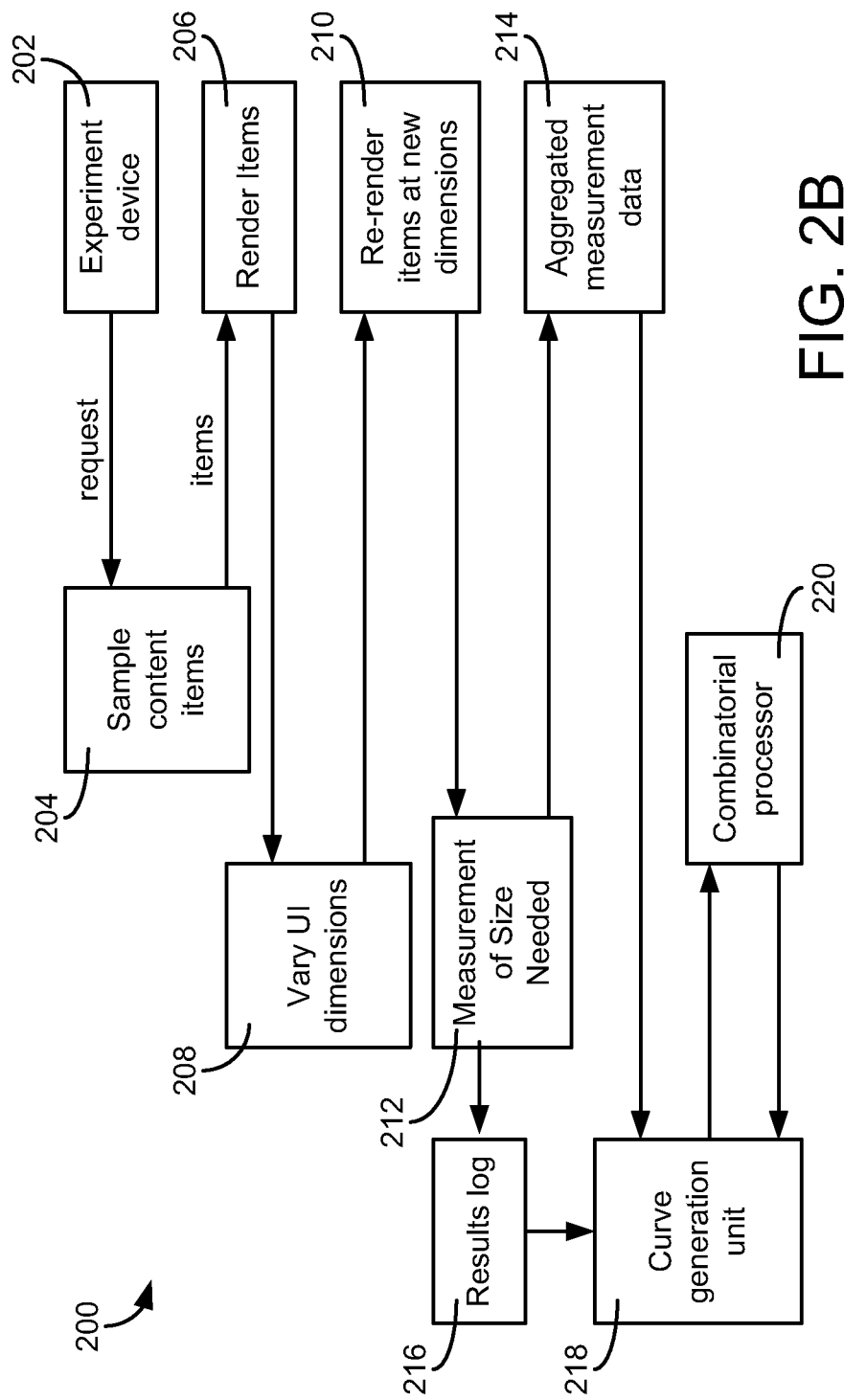
FIG. 2B is a block diagram illustrating an example method of generating a statistical distribution representing sizes of content items in accordance with a described implementation.

Referring now to FIG. 2B, a block diagram illustrating an example method 200 of generating a statistical distribution representing display sizes of content items is shown. Method 200 corresponds to block 152 of process 150 shown in FIG. 2A. Method 200 may be executable by, for example, the components of system 100 described in FIG. 1 for providing content to a resource. Method 200 may be executed for one or more content items independent of a request for a content item by a resource. In other words, the information determined in method 200 may be used by other components configured to serve content items to a resource.

Method 200 may include fetching a selected sample set of content items and rendering the content items according to a set of user interface features on a server. Method 200 may further include interacting with a measurements library that varies the user interface features on the server (e.g., an experiment device). The content item properties may be measured at each such variation. The content item measurements may be reported to the server which aggregates the measurement data and outputs a set of distributions for the measurements. This distribution may be used to generate, using a curve generation algorithm, a truncation curve based on the distribution. This truncation curve may be used to determine combinations of content items available for display on a resource, and system 200 may select the combinations for display.

Still referring to FIG. 2B, method 200 may include an experiment device 202 requesting sample content items 204. Experiment device 202 may be an experiment server or any other type of device configured to display content items. Sample content items 204 may be one or more content items that a content provider provides for display on a resource using the systems and methods described herein. In one implementation, sample content items 204 may be a group of related content items with similar characteristics.

Information known about sample content items 204 or device identifier information may be used to determine content item characteristics. This information may be used by method 200 to determine a size or other characteristic of the content items. As one example, sample content items 204 may be content items in a particular language (e.g., English, German, Turkish, etc.). Some languages may have a higher propensity to have longer words (e.g., German or Turkish words). Using language as a signal for grouping content items may be preferable because such information is available a priori, as opposed to actual text in the content item, which may be unknown until after the content item is rendered and displayed. In other words, language may be used as a preferable signal because the language is known before execution of any of the steps of method 200. As another example, sample content items 204 may be provided to a user device based on geographic location information. This location information may be used to determine content item display preferences (e.g., a language in which to display the text of the content item), which may be used to determine content item characteristics. As another example, any other information known about sample content items 204 or device identifier information may be used to determine content item characteristics.

Sample content items 204 may then be provided to an experiment device for rendering at block 206. The sampled content items may be rendered on any supported platform at the experiment device, and displayed inside a browser. At block 206, the dimensions of the content items may further be measured. In one implementation, the dimensions of the content items may be measured using JAVASCRIPT on the browser. For each content item, the content item may be displayed by constraining the width of the content item, and measuring the dimensions of the content item may then include measuring the height of the content item. In one implementation, a modified binary-search algorithm may be employed to find the width at which an inflection in the height needed to render the content item would occur, as the content item may flow to one fewer or one more line.

Still referring to FIG. 2B, method 200 may include repeating the process of rendering the content item on the experiment slot (block 206) to find truncation points for a given content item. After a content item is rendered at block 206, the dimensions of the content item may be varied at block 208. The varying of the dimensions may generally include varying the width of the content item. Then, the content item may be re-rendered at block 210, and the activities of blocks 206-210 may be repeated for varying widths. After rendering the content item for various dimensions, the size needed for the content item (e.g., a height and width) may be measured at block 212 and logged at block 216.

Given a large number of sample content items that are rendered and measured, it can be probabilistically determined the number of content items that might truncate if rendered into a fixed content slot of known size, with given fixed input variables such as font-face, font size, platform, language, etc. Given such information, a distribution may be derived for a given acceptable percentage of truncated content items. Method 200 includes aggregating such information at block 214 and generating the distribution at a curve generation unit 216. Curve generation unit 216 may include generating a curve of the distribution of, for example, the height and width of a content item. The curve distribution is shown in greater detail in FIGS. 4A-E.

Still referring to FIG. 2B, method 200 may include using a combinatorial processor 220 to determine a combination of content items that can fit in a given content slot. Combinatorial processor 220 may receive information from curve generation unit 216 for each content item. The information may include information relating to a width and height relationship for each content. Combinatorial processor 220 may use the information to determine a fit of more than one content item in a content slot such that all content items display properly in the content slot, or are very likely to display properly in the content slot.

In a content slot where more than one content item may be shown, some of the content items may need less space or more space compared to other content items. Combinatorially selecting sizes based on the measured distributions determined at block 212 may allow the content server to more efficiently use the space in the content slot. For example, it may be 95% likely that a first content item will be shorter than 100 pixels (px) of height, and it may be much less likely that a first content item and second content item will need more than 200 px of height combined.

In one implementation, the activities of combinatorial processor 220 may be used for a single content item. For example, an individual content item may be broken into its constituent portions (e.g., title, main text, visible URL). The space needed for each individual portion may be used by combinatorial processor 220 to determine the space needed by the whole content item.

In one implementation, method 200 may be implemented in an offline, internal process, and the results may be used by, for example, system 100 when a content request is received. Method 200 may be used to populate a map of height and width values at a given truncation-percentile (e.g., the space needed in a content slot such that no more than X % of content items will be truncated in the content slot, wherein X represents a desired threshold).

The truncation curves may be used as an input to synthesize better approximations under various conditions. For example, the truncation curves may pertain to a single content item as described above, but several distribution sets may be obtained for situations where two or more content items may be displayed within a given slot. Such distribution sets are shown in greater detail in FIGS. 4B-C.

Referring again to FIG. 2A, process 150 may further include receiving, at a data processing system via the computer network, a request to provide a content item for display in a slot of the resource (block 154). This request for content may be received by, for example, data processing system 120.

Still referring to FIG. 2A, process 150 may further include selecting content items for display in the slot based on the statistical distribution (block 156). The activities of block 156 may include optimizing an appearance of the content item in the slot based on the statistical distribution or maximizing a number of a plurality of content items in the slot based on the statistical distribution. In other words, at block 156, data processing system 120 may choose one or more content items for display based at least in part on data such as the data included in the truncation curves generated by method 200. The activities of blocks 154 and 156 may be carried out using method 300 described in reference to FIG. 3.

Referring now to FIG. 3, a flow diagram of a method 300 for serving parameter-dependent content to a web page via a computer network, in accordance with an illustrative implementation, is shown. Method 300 may be executed to provide content to a web page, receive content slot parameters related to the content provided to the web page, and to provide a second content item based on the content slot parameters. The second content item may be provided at least in part based on the content item size distribution as determined in the method of FIG. 2. In other words, method 300 may use in part the activities of method 200 in determining content to provide to a web page.

Referring still to FIG. 3. method 300 may include the act of receiving a request for content (block 305). For example, the request may be sent from an entity to place content on their resource, including, for example, a web page operator. The request may be transmitted via a network and received by a data processing system such as a content placement server. In one implementation, the content may be received from a content provider and provided to the web page operator or other entity.

In one implementation, the request for content may be responsive to one or more actions made by a user device. For example, a user device may request access to a resource hosted by an entity. The resource may have one or more content slots that need content. The entity may request content from system 100 that is suitable for the content slot.

In one implementation, the request is received by a content placement server. The request may also be made by the publisher of a resource. In one implementation, the request may be made in real-time (e.g., after a user device requests access to a resource and prior to displaying the resource to the user device). In indicator may be used to identify a browsing session, browser, user device, or computing device that includes one or more processing circuits.

In another implementation, the request for content may include additional information about the content slot, such as a unique content slot ID, data about parameters related to the content slot, or data used to retrieve relevant content. In some implementations, the request may lack certain data. For example, the request may lack data about parameters of the content slot (e.g., the unique content slot id, parameter data, position data, or style data).

Referring still to FIG. 3, method 300 may include an act of providing content including at least one tag (block 310). For example, if the content slot is a legacy slot for which certain parameter data does not exist, then a rich media HTML content item may be selected that includes a JAVASCRIPT tag to a JAVASCRIPT program that is capable of executing in the browser and retrieving data about one or more content slot parameter.

Block 310 may include the activity of identifying the content slot as a legacy content slot incapable of running JAVA-SCRIPT code at the content request time as described above. Determining whether the content slot is a legacy content slot may be done in a plurality of ways. In one implementation, such a determination may include looking up the content slot code of the content request in a database that contains information about the type of content slot. A content slot code may be an identifier used by a data processing system or a content placement server. The content slot code may be associated with various web operator or publisher settings (e.g., style, color, and font size). In another implementation, such a determination may include correlating the URL of the web page or the web page operator with legacy content slots. In yet another implementation, such a determination may include first attempting to execute JAVASCRIPT at the content request time, and, upon determining that the content slot was unable to execute the JAVASCRIPT, determine that the content slot is a legacy content slot.

In one implementation, block 310 may include selecting a rich media content item for the content slot. The rich media content item may be selected based on one or more content criteria received from the content request. For example, block 310 may include selecting the content based on the content of the web page, such as keywords associated with the resource, semantic concepts, or content verticals or topics. In another implementation, block 310 may include selecting the content based on device identifier characteristics or previous content or resources provided to the user device. In another implementation, block 310 may include selecting content based, at least in part, on an online content bidding process. For example, a plurality of online content providers may make a bid in an online auction for certain keywords. If one or more of those keywords are associated with the content request for a resource, then the content placement server may be more likely to select content belonging to the highest bidder of one or more of those keywords. The selected content may be any type of content (e.g., HTML content, expandable or above the fold content, other multimedia content that includes one or more of text, audio, still images, animation, video, or interactive content, or non-rich media content).

Block 310 may include injecting a tag into the provided content. For example, block 310 may include appending the tag into the HTML code of the rich media content. In another implementation, block 310 includes injecting the tag into a predetermined percentage of selected content for a given resource or content slot. For example, the tag may be injected one or two percent of all selected rich media content with the measuring tag. Injecting the tag may include appending the tag to the code associated with the content (e.g., appending the code to the end of the HTML code associated with the content, appending or embedding the code to any portion of the HTML code associated with the content, or linking to the HMTL code in any manner such that it may be executed by the server associated with the resource of the content slot).

In one example, block 310 includes providing the following HTML code in response to the content request. The first block of code corresponds to content slot data, which may be relevant content data (e.g., the content slot ID) that is not available in the content request itself. The second block of code is the measuring script tag that loads the parameter measurement script.

<! -- content html/js -->
<script>
ContentSlotData={
pageUrl: 'http://example.com/page.html',
slotname: '123',
width: 728,
height: 90,
client: 'web-property-code'
//other content slot-related data if required.
};
</script>
<script src=http://pagead2.anotherexample.com/pagead/js/dam.js>
</script>
</html>

The tag may be a JAVASCRIPT tag configured to execute at the web page server. In another implementation, the JAVASCRIPT tag may execute on the user device. In yet another implementation, a web browser executes the JAVASCRIPT tag. The tag, when executed, can determine at least one parameter of the content slot of the resource. In this example, the "dam.js" tag may be executed to determine the content slot position, page size, browser document size, and other required parameters. Block 210 may further include combining the data determined by the JAVASCRIPT with other data stored in a database that is associated with the resource or content slot.

In one implementation, the JAVASCRIPT code determines the one or more parameter by reading parameters passed from data processing system 120. In another implementation, the JAVASCRIPT can use a web browser document object model (DOM) manipulation API to traverse the DOM and request information, including, for example, size and location, from the standard JAVASCRIPT APIs available when running in a modern browser.

Referring still to FIG. 3, method 300 may include an act of receiving at least one content slot parameter (block 315). For example, block 315 may include receiving at least one of a parameter about one or more content slots, the resource, browser, and user device determined at block 310. The parameter data may be received via a URL or any other means of transmitting information from a resource operator to system 100 via a computer network 105. In one implementation, the parameter data may include one or more identifier, (e.g., the content slot code of the content slot). In another implementation, the parameter data may be combined with other previously gathered data.

Referring still to FIG. 3, method 300 may include storing the content slot parameter in at least one database (block 320). In one implementation, the parameter may be combined with previous measurements of parameters associated with the same content slot code and stored in the database. In another implementation, block 320 includes storing every measurement of a parameter received for the content slot. In another implementation, block 320 includes combining the parameters into one or more parameter metric. The parameter metric may include an average parameter, standard deviation, variance, range, or any other metric that is indicative of a statistic of a plurality of parameters. For example, block 320 may include storing the average X coordinate, instead of every measurement of the X coordinate, if the X coordinate is stable or stable enough for a parameter-dependent content item.

Referring still to FIG. 3, method 300 may include identifying a type of content slot (block 325). For example, block 325 can include evaluating the received content slot parameter and determining that the content slot is an expandable content slot or an above the fold content slot. Block 325 may include retrieving content slot parameter data from a database. The retrieved data may correspond to one or more measurements for one or more parameters. For example, block 325 can include the act of retrieving a plurality of measurements for the X coordinate of the content slot. Each measurement of the X coordinate of the content slot may correspond to a measurement received and stored via method 300.

In one example, it may not be possible to retrieve content slot parameter data because parameter data may not be stored in the database or otherwise be inaccessible. If there is no parameter data in the database, then method 300 may include one or more of selecting a rich media content item for the content slot (block 310), injecting a tag into rich media (block 310), providing the rich media content including the tag for display on the content slot (block 310), receiving parameter data about the content slot (block 315), and storing the parameter data in the database (block 320).

In another example, block 325 may include determining that there are insufficient measurements for one or more parameters. The measurements may be insufficient if there are a fewer number of measurements than a predetermined threshold. For example, there may be 20 measurements for the X coordinate, and the predetermined threshold may be 100 measurements. In this example, method 300 may trigger one or more acts included in method 300.

In one implementation, identifying the type of content slot (block 325) may include a determination that the data is stable. For example, the data may be stable if there are a sufficient number of measurements of a parameter (e.g., above a threshold). Then a plurality of measurements for a parameter can be compared to each other to determine whether the measurements are the same or approximately the same and therefore stable in this example. The method may further compare the difference between measurements with a stability threshold. In another implementation, block 325 may include performing a statistical analysis to determine a stability metric. The stability metric may be determined by identifying the variance of measurements of a parameter, the average difference between measurements of a parameter, or any other metric that identifies the stability or variation of measurements over time or over a number of measurements. For example, the parameters may be the horizontal and vertical coordinates (X and Y coordinates) in pixels of the content slot from the top left corner of the web page. The Y coordinate may be the same from one measurement to another, whereas the X coordinate may vary by one or more pixels from one request to another. Thus, the stability metric for the Y coordinate may indicate that measurements of the parameter are stable, and the stability metric for the X coordinate may indicate that the measurements of the parameter are unstable. The stability metric may indicate, e.g., a range of variation, a likelihood that the next measurement of the parameter will fall within a certain range of coordinates, or a standard deviation.

The stability metric may indicate whether the measurements for one or more parameters are stable enough to provide a certain type of advertisement. For example, method 300 may include determining that a content slot's vertical position is stable, while the content slot's horizontal position varies significantly from content request to content request. Method 200 may determine that while an expandable content that expands in the horizontal direction may be clipped, an expandable content that expands towards the bottom of the page may not be clipped. Thus, method 200 may include identifying the content slot as having content slot parameter data that is stable enough to consistently display an expandable content that expands toward the bottom of the page without being clipped.

Similarly, content slot identification (block 325) may include identifying the measurements of a parameter of a content slot as being stable enough to consistently display an above the fold ad. For example, block 325 may include analyzing parameters (e.g., the position browser document size, and size (width, height) of the content slot) to determine one or more stability metrics. If the one or more stability metrics (e.g., standard deviation, variance, range, average difference) are below a stability threshold, then the method may include determining that the content slot can consistently display an above the fold content item.

In one implementation, block 325 may include determining that the parameter data for one or more parameters is not stable enough to display a parameter-dependent content. In this example, method 300 may then select a rich media content for the content slot (block 310), injecting a tag into rich media (block 310), providing the rich media content including the tag for display on the content slot (block 310), receiving parameter data about the content slot (block 310), and storing the parameter data in the database (block 320). In another example, content slot identification (block 225) may include a determination that there is insufficient parameter data on one or more parameter. Parameter data may be insufficient if there are a fewer number of measurements than a predetermined threshold. For example, there may be 20 measurements for the X coordinate, and the predetermined threshold may be 100 measurements. In this example, method 300 may proceed to implement one or more acts included in method 300, such as, in response to a request for content (block 305), providing additional tagged content (block 310) and receiving additional content slot parameters (block 315).

Referring still to FIG. 3, method 300 may include receiving a second request for content (block 330). For example, the second request may be made by a user device upon receiving a resource provided by the resource operator. The second request may be received by the data processing system. The second request may be for content to be displayed on a resource. The second request may be made from the same resource as the first request. The second request may further be for the same content slot as the first request. In some implementations, the second request follows the first request. In other implementation, the second request may be subsequent to the first request. In yet other implementations, there may be many other requests for content made by the resource operator between the first request and the second request.

Referring still to FIG. 3, method 300 may include an act of providing content corresponding to the identified type of content slot (block 335). For example, block 235 may include providing content corresponding to parameter data in response to a second request for content (block 335). For example, at the time of a first content request (Block 305), content capable of measuring one or more parameters of the content slot or web page may have been provided. Upon receiving the measurement data (block 315) and identifying the content slot (block 325), content can be provided in response to a second content request (block 335).

In one implementation, block 335 may include identifying the type of content slot and then providing content corresponding to the type of content slot for display on the web page. For example, method 300 may include determining that multiple content items may be provided in the content slot without truncating or clipping the content items in the space of the content slot. Block 335 may then include providing the multiple content items as determined during method 200 of FIG. 2.

In one implementation, block 335 includes filtering out content based on the parameter data. For example, there may not be sufficient parameter data or the parameter data may not be stable enough to provide an content slot parameter-dependent content (or a combination of multiple such content items) to the content slot. In this case, block 335 may include identifying such combinations of content items. For example, using the outputs of curve generation unit 216, block 335 may include determining that certain combinations of content items are likely not to fit in the content slot.

In one implementation, block 335 may include selecting content based on a selected criteria. Content selection criteria may include, e.g., interest categories, demographics, geographic region, semantic concepts, or content verticals. Selection criteria may further include the type of content slot. In one implementation, block 335 can include the act of a content provider selecting a content slot that has a parameter corresponding to a certain type of content. For example, a content provider may select their content items to content slots that have parameters corresponding to a certain type of content.

Referring again to FIG. 2A, process 150 may further include updating the statistical distribution based on new requests of content items (block 158). For example, upon receiving a new request for a content item, the activities of process 150 may be repeated to determine a set of content items that are eligible for display based on the request (e.g., based on the content slot parameters associated with the request).

The systems and methods of FIGS. 1-3 may be applied to other services that render content items of variable size (e.g., the combinations of content items as described herein) into an area of fixed size. Example areas of applications may include advertising networks, gadget publishers, etc. The systems and methods can also be used in non-space constrained pages where truncation may not necessarily be the concern, but vertical-height need may be a consideration.

Referring generally to FIGS. 4A-E, graphical illustrations of measuring content item size and curve generation based on the content item size information is shown in greater detail. The graphical illustrations shown in FIGS. 4A-E may be generated by a curve generation unit 216 as described in FIG. 2.

Figure 4B:
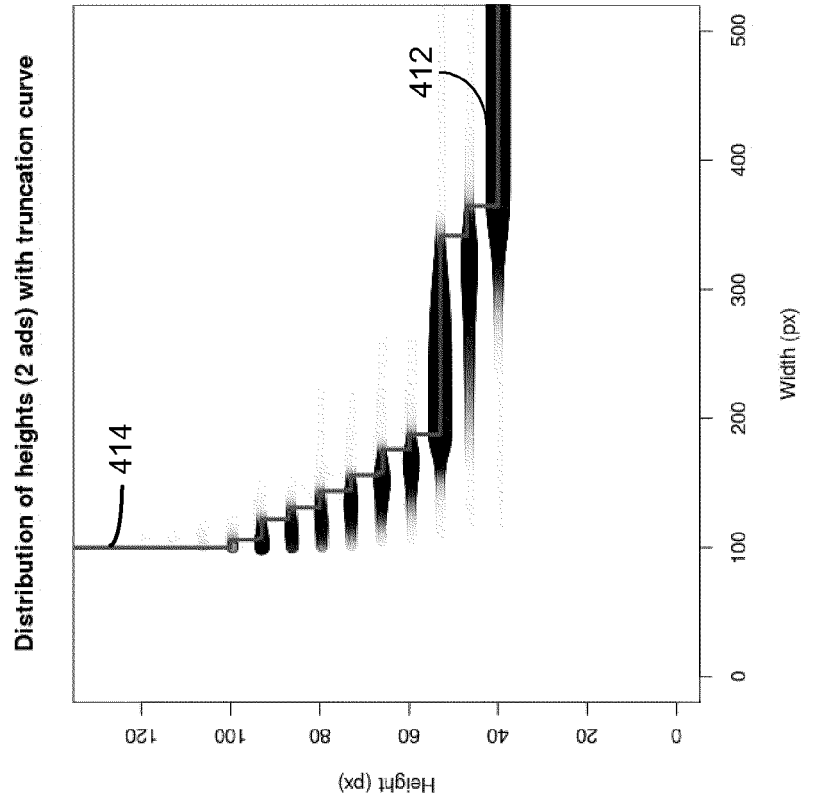
FIG. 4B illustrates a height and width distribution for two content items in accordance with a described implementation.
Figure 4A:
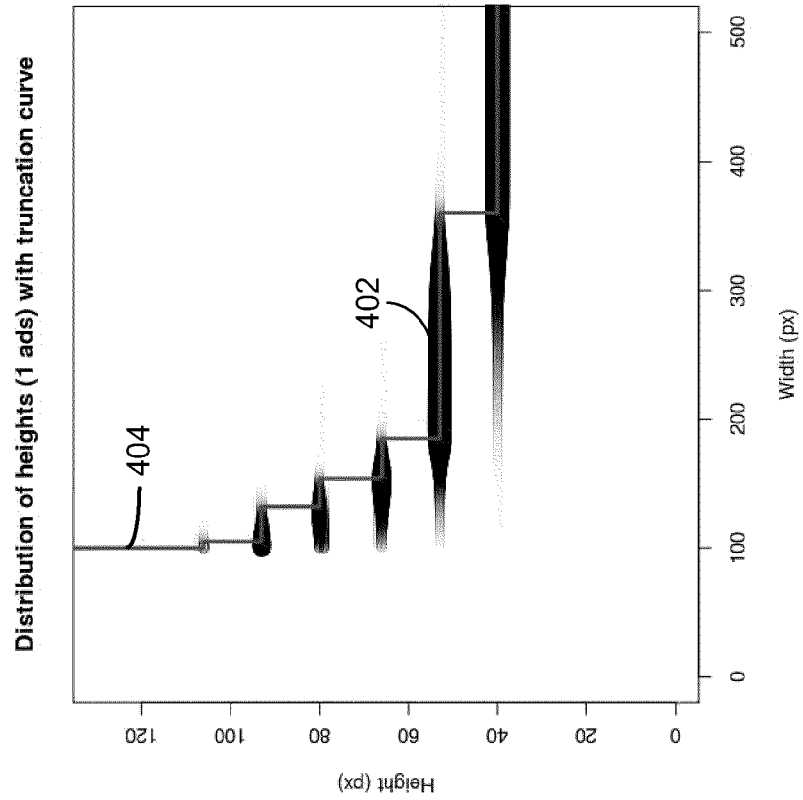
FIG. 4A illustrates a height and width distribution for a content item displayed in an experiment slot at an experiment device in accordance with a described implementation.

FIG. 4A illustrates a sample set of five thousand content items in the English language rendered in Arial font face, 9 px, in a browser with a classic content layout. The content items are rendered on the browser, and a comparison between the width and height of the content items are plotted on graph 400.

The "clouds" represent the number of content items that need a given width/height to be rendered. The thicker and darker "clouds" represent more content items included as part of the distribution for the particular height. For example, for a width of about 100 px, a majority of content items would need about 90 px of height. As the width increased, the content items would need less height. For example, for a width of 200 px, almost all content items would need a height of about 50 px, as represented by cloud 402. At a width of 300 px or more, more and more content items would only need a height of about 40 px.

The solid line 404 represents a 95% truncation curve. That is, for any given width, 95% of the content items may have equal or less height than the truncation curve. As the width increases, content items need less height to be rendered, so the truncation curve decreases. The determination of the truncation curve may be made by curve generation unit 216 and combinatorial processor 220 of FIG. 2.

FIG. 4B illustrates the distribution for combinations of two content items on graph 410. Instead of rendering a single content item on the browser, two content items are rendered, and a combined width and combined height of the two content items are determined. In one implementation, the two content items may be rendered in the browser separately, and then the height and width information for both content items may be added together to obtain the combined width and height. In another implementation, the two content items may be rendered and measured together. The combined width and height are then divided by two to determine an average height and width for a single content item.

Compared to the clouds (e.g., cloud 402) of graph 400, there are more clouds (e.g., cloud 412) in graph 410. Since two content items are rendered in the embodiment of FIG. 4B the combinations of content items allow for a more spread out distribution of content items. Further, truncation curve 414 of graph 410 is shown to have more "steps" compared to truncation curve 404 of graph 400. Since the two content items are rendered and more combinations are possible, it may be possible to more accurately determine a maximum height requirement to render a particular content item or combination of content items.

Figure 4D:
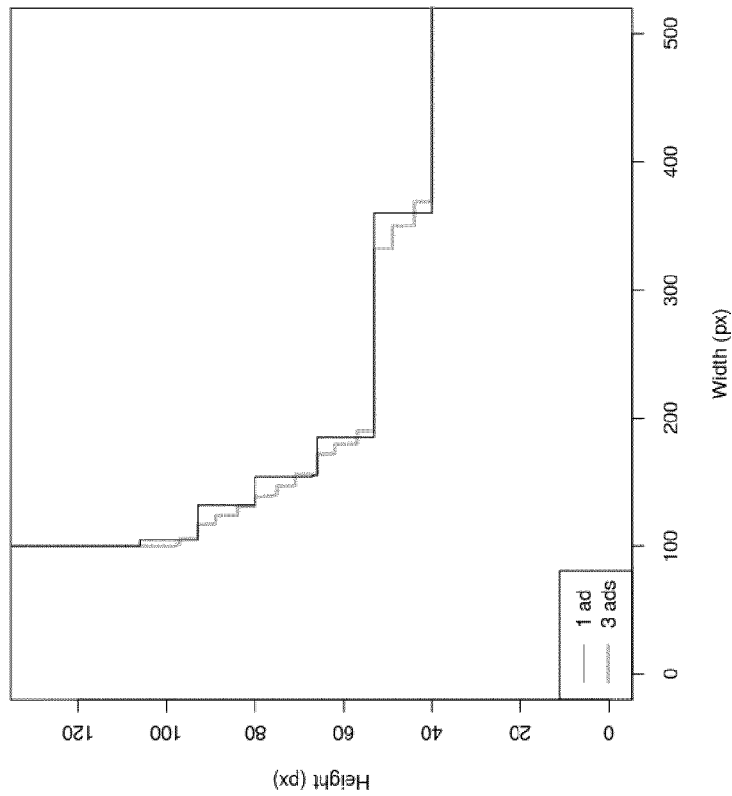
FIG. 4D illustrates a comparison between the truncation curve of FIG. 3A for the single content item and the truncation curve of FIG. 3C for the three content items in accordance with a described implementation.
Figure 4C:
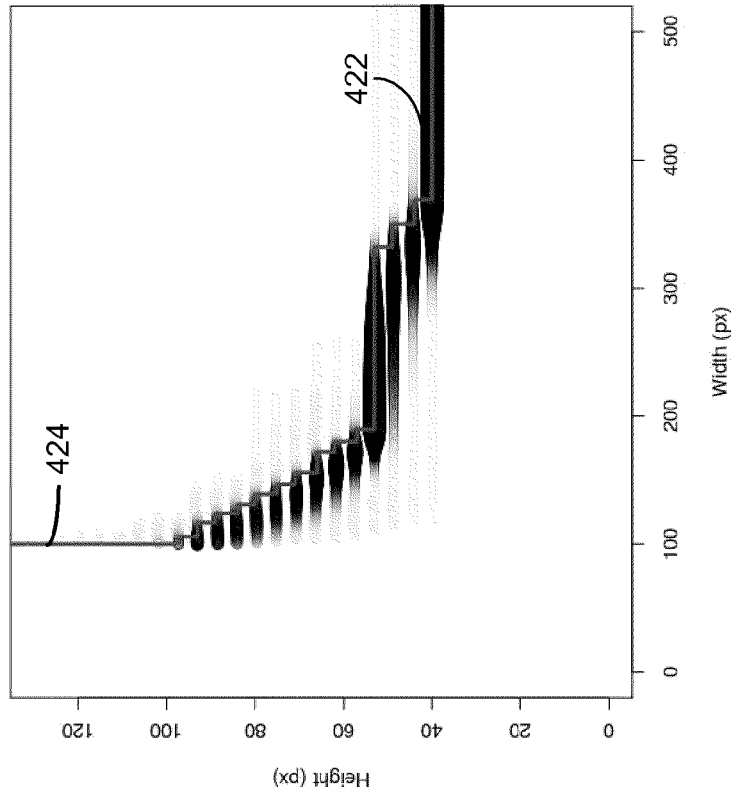
FIG. 4C illustrates a height and width distribution for three content items in accordance with a described implementation.

FIG. 4C illustrates the distribution for combinations of three content items on graph 420. Compared to graphs 400, 410, more clouds (e.g., cloud 422) are shown, illustrating a more spread out distribution of content items for varying width and height combinations. Further, truncation curve 424 is shown with more "steps" compared to truncation curves 404, 414, indicating more possible maximum heights for a content item for a particular width. Referring now to FIG. 4D, a graph 430 illustrating the difference between truncation curve 404 of FIG. 4A and truncation curve 424 of FIG. 4C is shown.

Figure 4E:
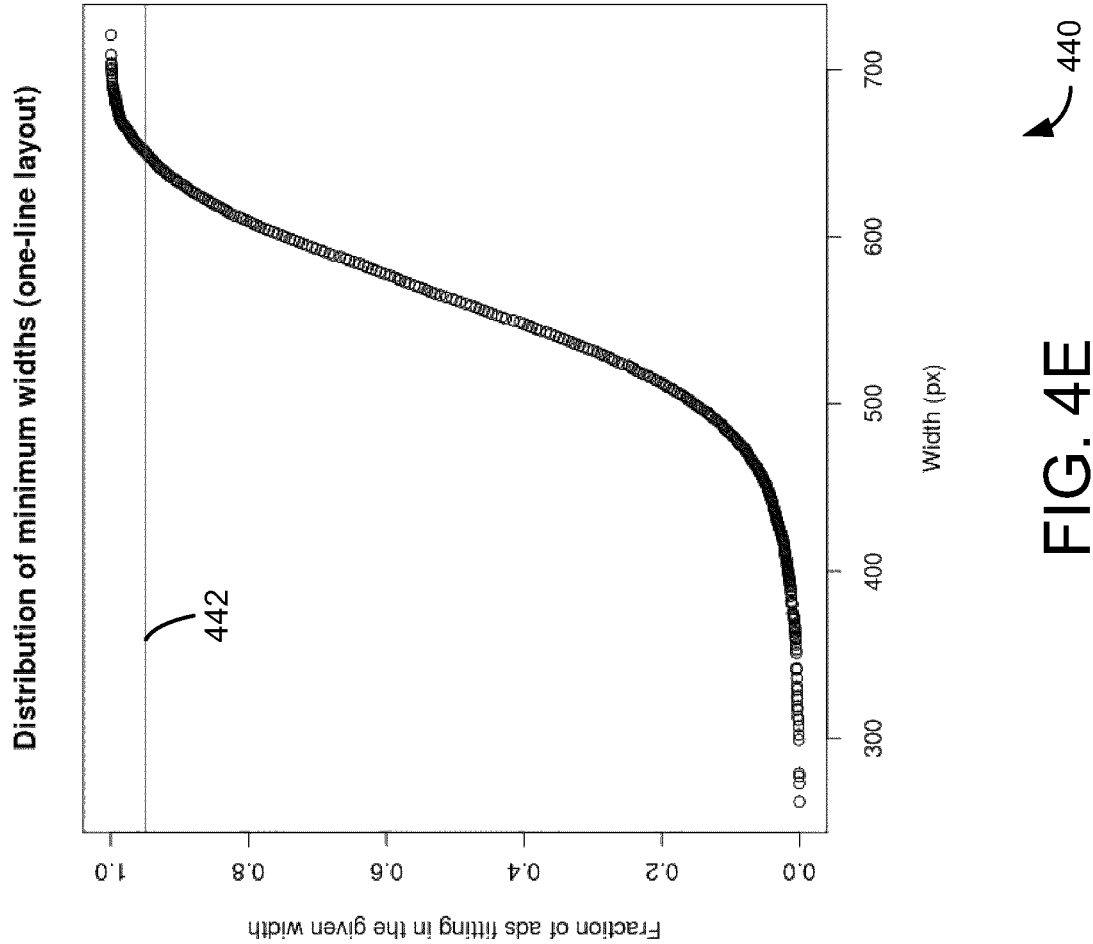
FIG. 4E illustrates a distribution of a minimum width needed to render a portion of the content items in the set of content items in accordance with a described implementation.

FIG. 4E and graph 440 illustrates the distribution of the width needed to render the same sample set of 5000 content items, in a different layout (e.g., a one-line layout). Most of the content items would need 500-600 px to be rendered as shown. Some of the content items may need more than 600 px. The horizontal line 442 indicates that a 95% of the content items can be rendered, and would correspond to about 630 px from the curve (specific to the given language, font face, font size, etc.).

The outputs shown in FIGS. 4A-E may be used by, for example, system 100 and method 300 for content selection. For example. upon receiving a request for content, system 100 and method 300 may use the information provided by graphs 400-440 to determine combinations of content items that may fit in the content slot. For example, if the content slot has a height of 100 px and a width of 300 px, the truncation curves shown in FIGS. 4A-D may be used to select a content item which is "below" the truncation curve.

Figure 5:
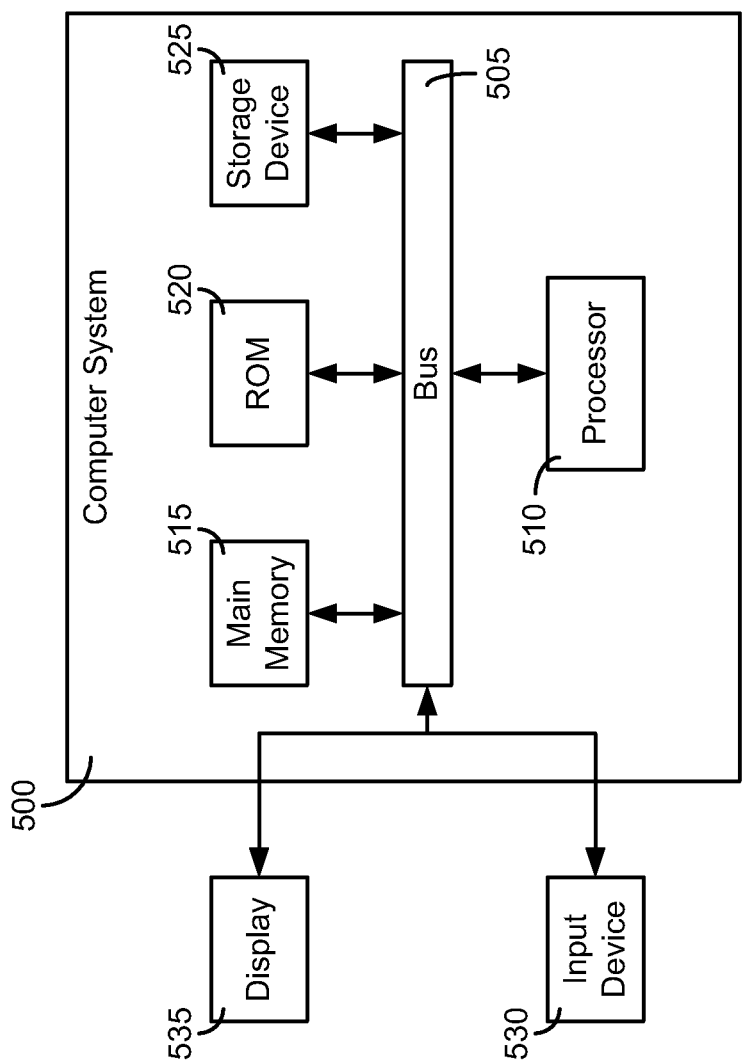
FIG. 5 is a block diagram illustrating an architecture for a computer system that may be employed to implement various elements of the systems and methods in accordance with a described implementation.

Referring now to FIG. 5, a block diagram of a computer system 500 is shown in accordance with a described implementation. Computer system 500 may be used to implement the systems and methods described herein, including, for example, user device 110, resource operator 115, data processing system 120, content provider 125, content slot identification module 130, content slot measurement module 135, and database 140.

Computer system 500 may include a bus 505 or other communication component for communicating information and a processor 510 or other processing circuit coupled to bus 505 for processing information. Processor 510 may be implemented as a general purpose processor, an application specific integrated circuit (ASIC), one or more field programmable gate arrays (FPGAs), a group of processing components, or other suitable electronic processing components.

Computer system 500 may also include main memory 515, such as a random access memory (RAM) or other dynamic storage device, coupled to bus 505 for storing information, and instructions to be executed by processor 510. Main memory 515 may also be used for storing position information, temporary variables, or other intermediate information during execution of instructions by processor 510. Main memory 515 may be or include non-transient volatile memory or non-volatile memory. Computing system 500 may further include a read only memory (ROM) 520 or other static storage device coupled to bus 505 for storing static information and instructions for processor 510. A storage device 525, such as a solid state device, magnetic disk, or optical disk, may be coupled to bus 505 for persistently storing information and instructions.

Computing system 500 may be coupled via bus 505 to a display 535, such as a liquid crystal display, or active matrix display, for displaying information to a user. An input device 530, such as a keyboard including alphanumeric and other keys, may be coupled to bus 505 for communicating information and command selections to processor 510. In another implementation, input device 530 has a touch screen display 535. Input device 530 may include a cursor control, such as a mouse, trackball, or cursor direction keys, for communicating direction information and command selections to processor 510 and for controlling cursor movement on display 535.

According to various implementations, the processes described herein can be implemented by computing system 500 in response to processor 510 executing an arrangement of instructions contained in main memory 515. Such instructions can be read into main memory 515 from another computer-readable medium, such as storage device 525. Execution of the arrangement of instructions contained in main memory 515 causes computing system 500 to perform the illustrative processes described herein. One or more processors in a multi-processing arrangement may also be employed to execute the instructions contained in main memory 515. In alternative implementations, hardwired circuitry may be used in place of or in combination with software instructions to effect illustrative implementations. Thus, implementations are not limited to any specific combination of hardware circuitry and software.

Referring now to FIG. 6, an implementation of a network environment 600 is depicted. System 100 and methods 150, 200, and 300 may operate in network environment 600. In brief overview, network environment 600 includes one or more clients 602 that can be referred to as local machines, clients, client nodes, client machines, client computers, client devices, endpoints, or endpoint nodes in communication with one or more servers 606 (e.g., server, node, or remote machine) via one or more networks 105. In some implementations, client 602 has the capacity to function as both a client node seeking access to resources provided by a server and as a server providing access to hosted resources for other clients 602.

Although FIG. 6 shows a network 105 between clients 602 and servers 606, clients 602 and servers 606 may be on the same network 105. Network 105 can be a local-area network (LAN), such as a company Intranet, a metropolitan area network (MAN), or a wide area network (WAN), such as the Internet or the World Wide Web. In some implementations, there may be multiple networks 105 between clients 602 and servers 606. In such an implementation, network 105 may be a public network, a private network, or may include combinations of public and private networks.

Network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, network 105 may include a wireless link, such as an infrared channel or satellite band. The topology of network 105 may include a bus, star, or ring network topology. Network 105 may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, system 100 may include multiple, logically-grouped servers 606. In one implementation, the logical group of servers may be referred to as a server farm 610 or a machine farm 610. In another implementation, servers 606 may be geographically dispersed. In another implementation, machine farm 610 may be administered as a single entity. In still another implementation, machine farm 610 includes a plurality of machine farms 610. Servers 606 within each machine farm 610 can be heterogeneous—one or more of the servers 606 or machines 606 can operate according to one type of operating system platform.

In one implementation, servers 606 in machine farm 610 may be stored in high-density rack systems, along with associated storage systems, and located in an enterprise data center. In such an implementation, consolidating the servers 606 in this way may improve system manageability, data security, the physical security of the system, and system performance by locating servers 606 and high performance storage systems on localized high performance networks. Centralizing servers 606 and storage systems and coupling them with advanced system management tools allows more efficient use of server resources.

Servers 606 of each machine farm 610 do not need to be physically proximate to another server 606 in the same machine farm 610. Thus, the group of servers 606 logically grouped as machine farm 610 may be interconnected using a wide-area network (WAN) connection or a metropolitan-area network (MAN) connection. For example, machine farm 610 may include servers 606 physically located in different continents or different regions of a continent, country, state, city, campus, or room. Data transmission speeds between servers 606 in machine farm 610 can be increased if servers 606 are connected using a local-area network (LAN) connection or some form of direct connection. Additionally, a heterogeneous machine farm 610 may include one or more servers 606 operating according to a type of operating system, while one or more other servers 606 execute one or more types of hypervisors rather than operating systems. In these implementations, hypervisors may be used to emulate virtual hardware, partition physical hardware, virtualize physical hardware, and execute virtual machines that provide access to computing environments.

Management of machine farm 610 may be de-centralized. For example, one or more servers 606 may comprise components, subsystems and modules to support one or more management services for machine farm 610. In one of these implementations, one or more servers 606 provide functionality for management of dynamic data, including techniques for handling failover, data replication, and increasing the robustness of machine farm 610. Each server 606 may communicate with a persistent store and, in some implementations, with a dynamic store.

Server 606 may include a file server, application server, web server, proxy server, appliance, network appliance, gateway, gateway, gateway server, virtualization server, deployment server, secure sockets layer virtual private network ("SSL VPN") server, or firewall. In one implementation, server 606 may be referred to as a remote machine or a node.

Client 602 and server 606 may be deployed as or executed on any type and form of computing device, such as a computer, network device or appliance capable of communicating on any type and form of network and performing the operations described herein.

In an alternative implementation of the present disclosure, each content item may be measured to determine the size needed to display the content item for one or more given platforms, and that information may be stored with the rest of the content item's metadata. In other words, instead of executing method 200 to determine content item measurements and properties, the information may be a part of the content item's metadata and may be used similarly to the data determined by method 200 as described in the present disclosure.

In an alternative implementation, instead of running through the sample content items in a binary search, the height (or width) of the content item may be measured at fixed increments in width (or height). For example, instead of testing based on a width value determined using a binary search algorithm, testing may be based on fixed width values determined by method 100 or another preference of system 200 or the content provider.

In an alternative implementation, measurements other than pixels may be used to measure width and height of a content item. For example, the average number of characters in a content item, the average number of words in the content item, and the average width of a character in the content item may be measured to obtain a more coarser idea of the space needed for the content item instead of pixels.

Although an example computing system has been described with reference to FIG. 5, implementations of the subject matter and the functional operation described in this specification can be implemented in other types of digital electronic circuitry, or in computer software, firmware, or hardware, including the structures disclosed in this specification and their structural equivalents, or in combinations of one or more of them.

For situations in which the systems discussed herein collect information about users, or may make use of information about users, the users may be provided with an opportunity to control whether programs or features collect some or all user information (e.g., information about a user's social network social actions or activities, a user's preferences, or a user's current location), or to control whether and/or how to receive content that is more relevant to the user. In addition, certain data may be treated in one or more ways before it is stored or used, so that certain information about the user is removed when generating monetizable parameters (e.g., monetizable demographic parameters). For example, a user's identity may be treated so that no identifying information can be determined for the user, or a user's geographic location may be generalized where location information is obtained (e.g., city, ZIP code, state, etc.), so that a particular location of a user cannot be determined. Thus, users may have control over how information is collected about them and used by the systems and methods of the present disclosure for selecting content.

In other implementations, if the user selects to share information about the user, an identifier associated with a client device and/or a user of client device may be used to help select content to display on a web page for the user and client device. For example, the identifier may be used to identify an interest profile, and the interest profile may be used in addition to the content item size information to select content. In some implementations, the identifier may be associated with one or more client identifiers that identifies a client device (e.g., mobile device, home computer, etc.) or may itself be the client identifier.

Implementations of the subject matter and the operations described in this specification may be implemented in digital electronic circuitry, or in computer software, firmware, or hardware, including the structures disclosed in this specification and their structural equivalents, or in combinations of one or more of them. The subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input.

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of distributing content items to a resource via a computer network, the method comprising:
   generating a statistical distribution of height dimensions for a sample set of content items based on a slot width dimension and a parameter, the statistical distribution generated by rendering each of the content items of the sample set in an experiment slot at an experiment device and varying the slot width dimension for the experiment slot;
   generating a truncation curve based on the statistical distribution, the truncation curve indicative of a percentile of content items of the sample set with a height dimension at or below the truncation curve at a corresponding slot width dimension;
   receiving, at a data processing system via the computer network, a request to provide a content item for display in a slot of the resource; and
   selecting content items for display in the slot based on the truncation curve, wherein selecting content items includes at least one of:
      optimizing an appearance of a content item for display in the slot based on the truncation curve; or
      maximizing a number of a plurality of content items for display in the slot based on the truncation curve.

2. The method of claim 1, wherein the parameter comprises at least one of:
   a user interface (UI) parameter;
   a font; or
   a browser type.

3. The method of claim 1, further comprising updating the statistical distribution based on dimensional data received responsive to serving the selected content items.

4. The method of claim 1, wherein the statistical distribution is further obtained by:
   rendering a plurality of combinations of content items in the experiment slot at the experiment device; and
   determining height dimensions of the plurality of combinations.

5. The method of claim 1, wherein at least one content item is selected for display based on a plurality of parameters specified by a content provider.

6. The method of claim 5, wherein the sample set of content items is selected by categorizing content items and selecting related content items to form the sample set of content items.

7. The method of claim 6, wherein the content items are categorized based on information available prior to selection of at least one content item.

8. A system for distributing content items to a resource via a computer network, the system comprising a data processing system having at least one of a content slot identification module and a content slot measurement module, the data processing system configured to:
   generate a statistical distribution of width dimensions for a sample set of content items based on a slot height dimension and a parameter, the statistical distribution generated by rendering each of the content items of the sample set in an experiment slot at an experiment device and varying the slot height dimension for the experiment slot;

generate a truncation curve based on the statistical distribution, the truncation curve indicative of a percentile of content items of the sample set with a width dimension at or below the truncation curve at a corresponding slot height dimension;

receive a request to provide a content item for display in a slot of the resource; and select content items for display in the slot based on the truncation curve, wherein selecting content items includes at least one of:

optimizing an appearance of a content item for display in the slot based on the truncation curve; or maximizing a number of a plurality of content items for display in the slot based on the truncation curve.

9. The system of claim 8, wherein the parameter comprises at least one of:
a user interface (UI) parameter;
a font; or
a browser type.

10. The system of claim 8, wherein the data processing system is further configured to update the statistical distribution based on dimensional data received responsive to serving the selected content items.

11. The system of claim 8, wherein the data processing system is further configured to obtain the statistical distribution by:
rendering a plurality of combinations of content items in the experiment slot at the experiment device; and
determining width dimensions of the plurality of combinations.

12. The system of claim 8, wherein the data processing system is configured to select at least one content item for display based on a plurality of parameters specified by a content provider.

13. A non-transitory computer readable storage medium having instructions to distribute content items to a resource via a computer network, the instructions comprising instructions to:

generate a statistical distribution of height dimensions for a sample set of combinations of content items based on a slot width dimension and a parameter, the statistical distribution generated by rendering each of the combinations of content items of the sample set in an experiment slot at an experiment device and varying the slot width dimension for the experiment slot;

generate a truncation curve based on the statistical distribution, the truncation curve indicative of a percentile of combinations of content items of the sample set with a height dimension at or below the truncation curve at a corresponding slot width dimension;

receive a request to provide a content item for display in a slot of the resource; and select content items for display in the slot based on the truncation curve, wherein selecting content items includes at least one of:

optimizing an appearance of the content item for display in the slot based on the truncation curve; or maximizing a number of a plurality of content items for display in the slot based on the truncation curve.

14. The non-transitory computer readable storage medium of claim 13, wherein the parameter comprises at least one of:
a user interface (UI) parameter;
a font; or
a browser type.

15. The non-transitory computer readable storage medium of claim 13, wherein the instructions further comprise instructions to update the statistical distribution based on dimensional data received responsive to serving the selected content items.

* * * * *